United States Patent
Leu et al.

(10) Patent No.: US 12,493,602 B2
(45) Date of Patent: Dec. 9, 2025

(54) MULTIHOST DATABASE HOST REMOVAL SHORTCUT

(71) Applicant: SAP SE, Walldorf (DE)

(72) Inventors: Hans-Joerg Leu, Dossenheim (DE); Dan Ding, Xi'an (CN); Srinivas Gajjalakonda, Heidelberg (DE); Fei Qiu, Xi'an (CN); Carsten Mueller, Bruchsal (DE); Alexander Schroeder, Berlin (DE)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 17/940,904

(22) Filed: Sep. 8, 2022

(65) Prior Publication Data

US 2024/0086386 A1    Mar. 14, 2024

(51) Int. Cl.
*G06F 16/22* (2019.01)
*G06F 16/27* (2019.01)

(52) U.S. Cl.
CPC ........ *G06F 16/2282* (2019.01); *G06F 16/273* (2019.01); *G06F 16/278* (2019.01)

(58) Field of Classification Search
CPC ... G06F 16/2282; G06F 16/273; G06F 16/278
See application file for complete search history.

(56) References Cited

U.S. PATENT DOCUMENTS

| | | | |
|---|---|---|---|
| 2015/0149509 A1* | 5/2015 | Leu | G06F 16/27 707/803 |
| 2015/0149513 A1* | 5/2015 | Beigel | G06F 16/2282 707/809 |
| 2018/0322157 A1* | 11/2018 | Lee | G06F 16/2471 |
| 2019/0065573 A1* | 2/2019 | Keller | G06F 16/2453 |

* cited by examiner

*Primary Examiner* — Apu M Mofiz
*Assistant Examiner* — Husam Turki Samara
(74) *Attorney, Agent, or Firm* — Fountainhead Law Group, PC

(57) ABSTRACT

The present disclosure provides more efficient techniques for removing a host from a multi-host database system. An instruction to remove a host system may be received. In response, a determination of whether the first host system does or does not store any source tables is made based on a host-type identifier for the host system. This determination may not require obtaining landscape information for each of the hosts in the database system. If the host system stores replica tables and does not store source tables, those replica tables may be dropped based on the determination that the first host system does not store any source tables. As such, in cases where table redistribution is not needed the landscape information is not obtained, thereby making the host removal process more efficient.

20 Claims, 5 Drawing Sheets

MULTIHOST DATABASE HOST REMOVAL SHORTCUT

BACKGROUND

The present disclosure pertains to cloud database systems and in particular to multi-host cloud databases.

One of the advantages provided by cloud database systems over traditional non-cloud database systems is "elasticity." In cloud computing, a system is said to provide "elasticity" when it is configured to be able to adapt to workload changes by automatically provisioning and de-provisioning computing, memory, and storage resources in an autonomic manner. Increasing the number of resources (e.g., in response to increased demand) may be referred to as "scaling-out" while reducing the number of resources (e.g., in response to decreased demand) may be referred to as "scaling-in." By use of these techniques, an elastic cloud database system may have the resources needed to meet the current demand.

In some cloud database systems scale-out and scale-in operations may be performed with high frequency in response to frequent changes in demand. This can become problematic as allocating and de-allocating resources may involve redistribution of data across greater or fewer resources which may take a significant amount of time for large datasets. Time lost while redistributing the data during scale-in operations offsets time gained (though improved performance) as a result of scaling-out operations. Accordingly, there is a need for more efficient scale-in operations.

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to receive a first instruction to remove a first host system from a multi-host database system including a plurality of host systems. The multi-host database system stores a plurality of source tables distributed across at least a portion of the plurality of host systems. The instructions may be further executable to determine, in response to the first instruction, that the first host system does not store any of the plurality of source tables based on a host-type identifier for the first host system. The first host system may store one or more replica tables that are replicas of corresponding source tables from among the plurality of source tables. The determination that the first host system does not store any of the plurality of source tables may be made without obtaining landscape information for each of the plurality of host systems. The instructions may be further executable to drop the one or more replica tables stored on the first host system based on the determination that the first host system does not store any of the plurality of database tables.

Some embodiments provide one or more non-transitory computer-readable medium storing computer program code comprising sets of instructions. The computer program code may include sets of instructions to receive a first instruction to remove a first host system from a multi-host database system including a plurality of host systems. The multi-host database system may store a plurality of source tables distributed across at least a portion of the plurality of host systems. The computer program code may further comprise sets of instructions to determine, in response to the first instruction, that the first host system does not store any of the plurality of source tables based on a host-type identifier for the first host system. The first host system may store one or more replica tables that are replicas of corresponding source tables from among the plurality of source tables. The determination that the first host system does not store any of the plurality of source tables may be made without obtaining landscape information for each of the plurality of host systems. The computer program code may further comprise sets of instructions to drop the one or more replica tables stored on the first host system based on the determination that the first host system does not store any of the plurality of database tables.

Some embodiments provide a computer-implemented method. The method may comprise receiving a first instruction to remove a first host system from a multi-host database system including a plurality of host systems. The multi-host database system may store a plurality of source tables distributed across at least a portion of the plurality of host systems. The method may further comprise determining, in response to the first instruction, that the first host system does not store any of the plurality of source tables based on a host-type identifier for the first host system. The first host system may store one or more replica tables that are replicas of corresponding source tables from among the plurality of source tables. The determination that the first host system does not store any of the plurality of source tables may be made without obtaining landscape information for each of the plurality of host systems. The method may further comprise dropping the one or more replica tables stored on the first host system based on the determination that the first host system does not store any of the plurality of database tables.

The following detailed description and accompanying drawings provide a better understanding of the nature and advantages of the present disclosure.

DETAILED DESCRIPTION

Figure 1:
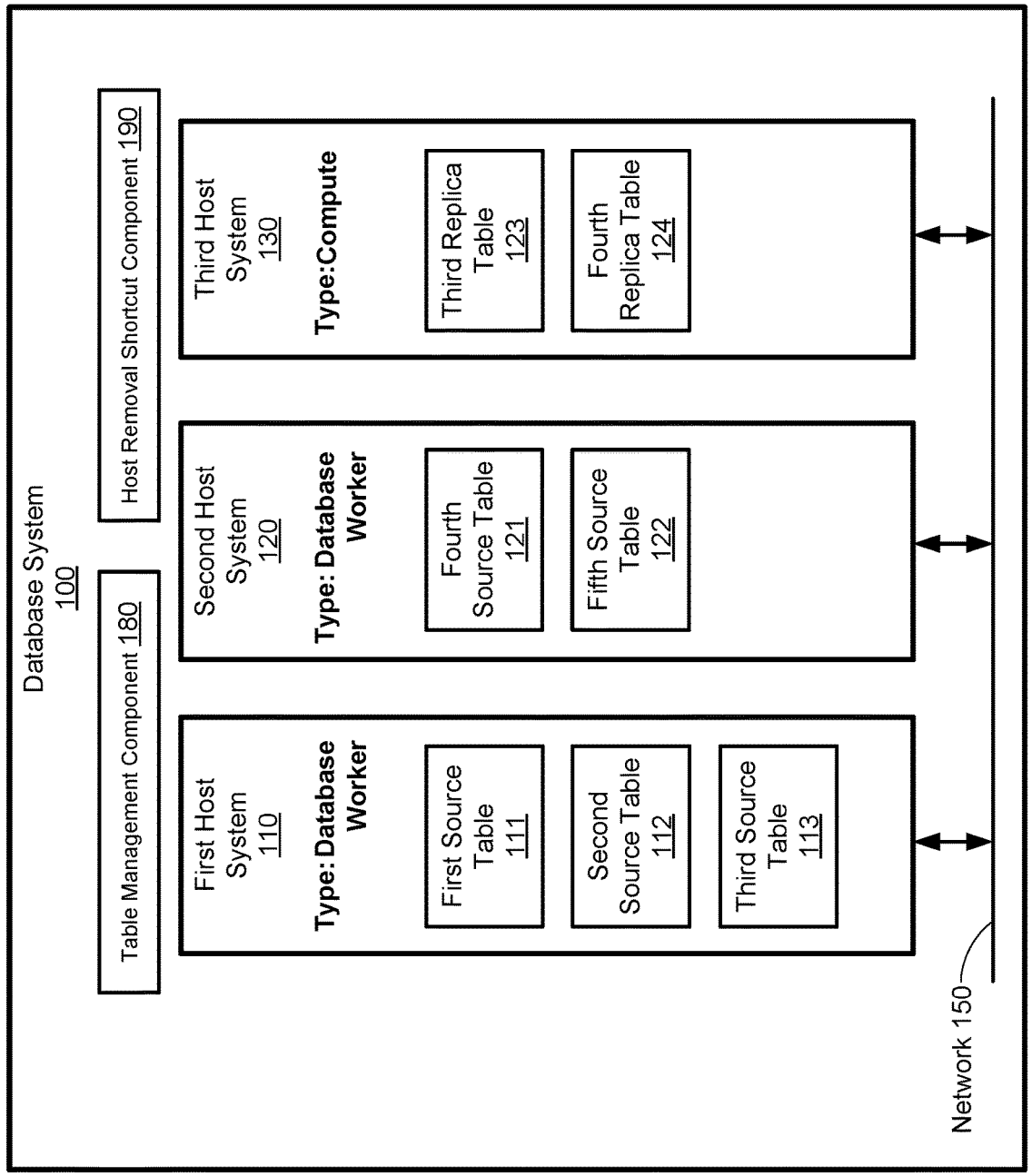
FIG. 1 shows a diagram of a multi-host database system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The term "multi-host database" refers to a database having tables distributed over two or more host systems within a database system. A "host system" refers to a computer system having processing and memory resources. To increase overall computation power and improve performance a multi-host database system may distribute tables of a database over a plurality of host systems, which are capable of communicating over a network to process database queries as needed. The term "database system" refers to a group of computer systems (e.g., server computers, virtual computers, etc.) in communication with each other to provide database functionality and management.

As mentioned above, in some cloud database systems, scale-out and scale-in operations may be performed with high frequency in response to frequent changes in demand. This can become problematic as allocating and de-allocating resources (e.g., resources of host systems) may involve redistribution of data across greater or fewer resources which may take a significant amount of time for large datasets. Time lost while redistributing the data during scale-in operations offsets time gained (though improved performance) as a result of scaling-out operations.

For instance, when a host system storing source tables of a database (e.g., a host providing an "index service") is to be removed, the database system may collect the entire landscape information (e.g., table, partitions, locations, and other information used in table redistribution) in order to redistribute the source tables of the host-to-be-removed to other hosts within the database system. However, in an elastic database system, not all hosts may store source database tables. An elastic database system may use hosts that only store replicas of source tables and not any source tables themselves. Such hosts may be referred to as "compute host," "compute server," "elastic node," or "elastic read-optimized node," for example. These terms are used because such hosts may be created during an elastic scale-out operation performed to better accommodate compute intensive workloads. The workloads are offloaded to new compute hosts storing replica tables. Overall performance of computing the workloads can be improved by use of compute hosts providing replicas of source tables as the compute hosts provide additional computer processing resources and memory resources to the database system.

The present disclosure provides techniques for efficiently removing hosts (e.g., manually or as part of a scale-in operation) that do not store source tables. For removal of hosts that store source tables it is important to collect the entire landscape information such that these source tables may be distributed to one or more other host systems instead of being dropped, thereby losing the information in the tables. However, removal of hosts that do not store source tables (e.g., they store replica tables), it may be possible to drop the tables stored on that host without losing the information in the tables. The information is not lost because the source table maintains that information and the replica being dropped merely replicated that information.

The present disclosure provides a host removal shortcut that determines whether a particular host-to-be-removed does not store source tables. The host removal "shortcut" technique that may be used is an operation in which the tables of a host that does not store source tables may be dropped without obtaining the entire set of landscape information and without performing a table redistribution operation. In some embodiments the database system may also determine whether the host-to-be-removed stores replica tables that have been specifically requested by a user of the database system and the shortcut technique may be used for hosts that do not store user-requested replicas.

For example, when a table redistribution operation is called to check and clean a service in a scale-out landscape, the database system may first collect information on the number, type, and locations of replicas on compute hosts (also called "elastic nodes"). This information may be obtained from Table Placement rules, for example. This information may be used as a restriction for determining whether the host removal shortcut may be used. Without collecting the entire landscape information, preprocessing of the clear service may check whether the host removal shortcut restrictions are fulfilled or not (e.g., the restriction is fulfilled if the host does not store any source tables and does not store any user-requested replica tables). If these restrictions are fulfilled, then collection of the entire landscape information, which may otherwise be performed during a table redistribution operations, is skipped. A table redistribution plan may be generated to drop the replica tables on the host.

Features and advantages of this technique are improved efficiency in host removal operations as fewer computing resources and memory resources are used since the entire landscape information is not obtained. By determining whether a particular host may be removed without collecting landscape information (e.g., because that host does not store source tables), the host may be removed more quickly. This is especially advantageous when scale-out operations have allocated compute hosts, and created replica tables on those source hosts, which will then be removed during scale-in operations after the workload has decreased.

Multi-Host Database Host Removal Shortcut

Further details of the host removal shortcut are described below with respect to FIG. 1-5.

FIG. 1 shows a diagram of a multi-host database system 100, according to an embodiment. In this embodiment the database system 100 includes a first host system 110, a second host system 120, and a third host system 130 communicatively coupled over a network 150. A database includes a first source table 111, a second source table 112, a third source table 113, a fourth source table 114, and a fifth source table 115 distributed across the first host system 110 and the second host system 120. The first host system 110 stores the first source table 111, the second source table 112, and the third source table 113 while the second host system 120 stores the fourth source table 121 and the fifth source table 122. The "type" of the first host system 120 may be "database worker," for example. This host-type may indicate that the first host system stores source tables. A host-type of the second host system 120 may also be "database worker."

In this embodiment, the third host system 130 does not store source tables. Instead, the third host system 130 stores a third replica table 123 that is a replica of the third source table 113 stored at the first host system 110. The third host system 130 also stores a fourth replica table 124 that is a replica of the fourth source table 121 stored at the second host system 120. The term "replica" is used because the source tables have been replicated on another host. However, the replica tables are not the source tables and may not be modified as if they were source tables. Any modifications that would be made to a table are propagated to the source table. Further, any modifications to the source table are propagated to the replicas.

One advantage of replica tables is that a set of tables may be replicated on the same host such that queries against that set of tables may be performed by the same host system without requiring communication between hosts (also called "cross node communication") over the network 150. In this embodiment, the database system 100 may has received an increased workload of queries against the third source table 111 stored at the first host system 110 and against the fourth source table 121 stored at the second host system 120 and allowed the third host system 130 as a "compute" host-type storing the third replica table 123 and the fourth replica table 124 in order to handle this demand.

The database system 100 also includes a table management component 180. The table management component 180 may be configured to collect landscape information and generate and execute table redistribution plans. The table management component 180 may also store table placement rules, which includes information on the number, type, and locations of source tables and replica tables within the database system 110. The table management component 180 may also store host-type indicators for each of the host system. The landscape information may include information on tables, partitions, locations, and other information used to generate a table redistribution plan, for example. The table management component 180 is further described below with respect to FIG. 2.

The database system 100 also includes a host removal shortcut component 190. This component is configured to determine whether a particular host-to-be-removed meets a set of restrictions and requirements in order to use the shortcut technique (e.g., dropping the hosts tables without collecting landscape information). For example, the first host system 110 and the second host system 120 store source tables and have a host-type of "database worker" indicating that they store source tables. Therefore, the host removal shortcut component 190 may determine that the shortcut technique may not be used to remove the first host system 110 or to remove the second host system 120. The third host system 130 does not store source tables, it stores replica tables instead, and it has a host-type of "compute" indicating that it does not store source tables. Therefore, the host removal shortcut component 190 may determine that the shortcut technique may be used to remove the first host system 110. The host removal shortcut component 190 and the host removal shortcut technique are further described below.

Figure 2:
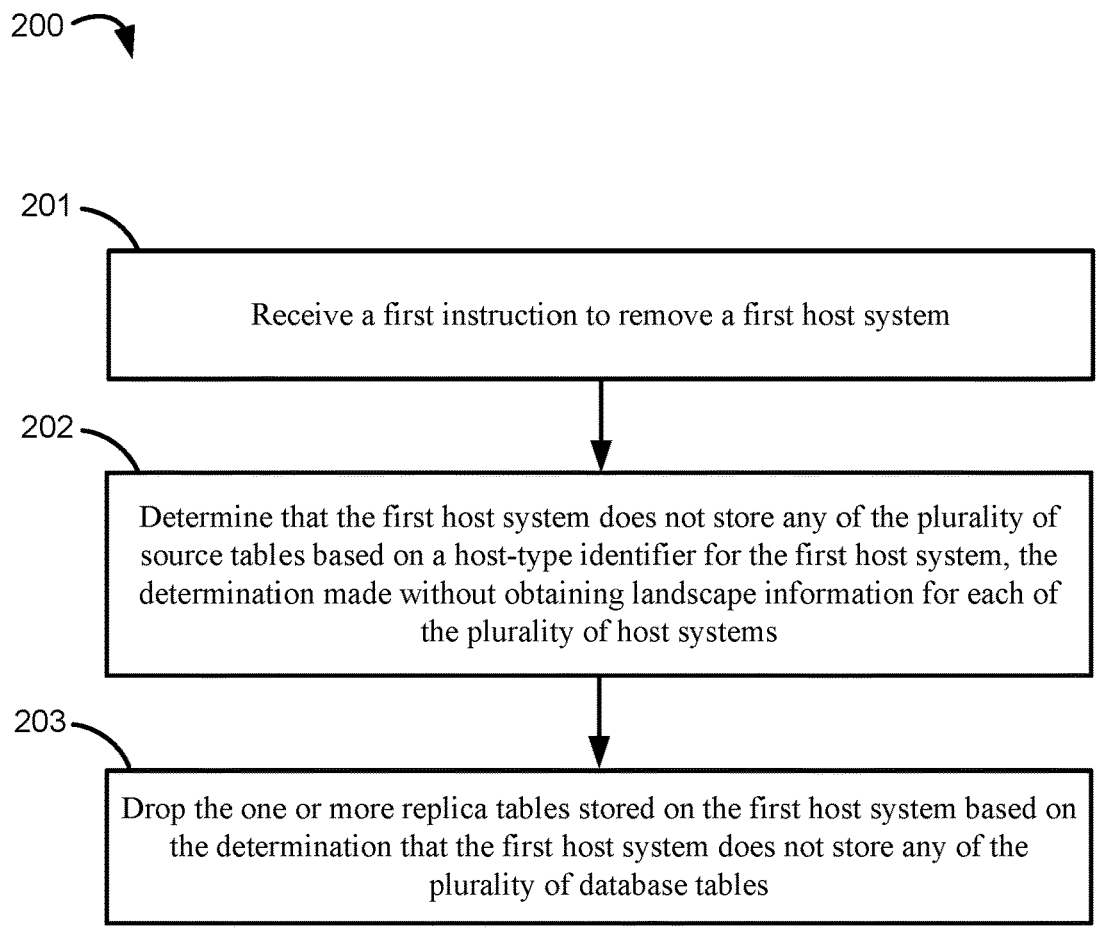
FIG. 2 shows a diagram of a method for removing host systems, according to an embodiment.

FIG. 2 shows a diagram of a method 200 for removing host systems, according to an embodiment. This method may be implemented by a multi-host database system, such as by the database system 100 described above with respect to FIG. 1. Host systems may be allocated to the database system during scale-out operations in response to increased demand and host systems may be removed (deallocated) during scale-out operations in response to decreased demand. Host system may also be allocated and removed manually. As mentioned above, certain host systems may not store source tables of a database and may be removed using a host removal shortcut technique that does not involve obtaining landscape information that may be collected when a host that is storing source tables is removed. The landscape information may be required to perform table redistribution but table redistribution may not be required when the host-to-be-removed does not store source tables. The method 200 in FIG. 2 shows an overview of the host removal shortcut technique.

A 201, the method may receive a first instruction to remove a first host system from a multi-host database system. The multi-host database system may include a plurality of host systems. The multi-host database system may store a plurality of source tables of a database distributed across at least a portion of the plurality of host systems. That is, some host systems may store source tables and some of the host systems may not store source tables. Host systems that do not store source tables may store replica tables which are replicas of the source tables. The database system may be configured to propagate modifications made to the source table to the corresponding replica table. A replica table may work different from the source tables in that the replica table may be configured by the database system to not be modified as source tables may be modified. Instead the database system may propagate modifications to the source table, and then back to the corresponding replica.

At 202, the method may determine, in response to the first instruction, that the first host system does not store any of the plurality of source tables based on a host-type identifier for the first host system. In some embodiment the host-type identifier may indicate a "compute" host type, which is configured by the database system to not store source tables. In other embodiments other host-type identifiers may be used to indicate that a host does not store any source tables. The first host system may store one or more replica tables that are replicas of corresponding source tables from among the plurality of source tables. The source tables corresponding to the one or more replica tables mare stored at other hosts systems from among the plurality of host systems. The determination that the first host system does not store any of the plurality of source tables is made without obtaining landscape information for each of the plurality of host systems. That is, the determination may be made based on the host-type identifier without obtaining information about other host systems or information about tables stored on other host systems. The landscape information may include table information identifying the plurality of source tables, partition information indicating how the plurality of source table are partitioned, and location information indicating which host systems store which source tables.

In some embodiments the method may also access one or more table placement rules stored in the database system to obtain the host-type identifier of the first host system. The table placement rules indicate a number and location of replicas of the plurality of tables among the plurality of host systems. The table placement rules may indicate how the plurality of source tables are partitioned among the plurality of host systems. In other embodiments the host-type identifier information may stored in a different data structure.

As mentioned above, if a host system does not store source database tables then it may be possible to remove that host without performing table redistribution as the information in the replica table is still maintained in the source table. Since table distribution may not need to be performed, the landscape information used in performing table redistribution may not need to be obtained.

At 203, the method may drop the one or more replica tables stored on the first host system based on the determination that the first host system does not store any of the plurality of database tables.

In some embodiments the replica tables may not be dropped without collecting landscape information if one or more of the replica tables were specifically requested to be created by a user. In such cases the user-requested replica tables may be maintained and redistributed to another host system. Landscape information may be obtained in order to perform the redistribution.

Accordingly, in some embodiments the method may determine that none of the one or more replica tables stored on the first host system were created based on a specific user-initiated request for a particular replica table to be created. In such cases the dropping of the one or more replicas tables stored on the first host system may be performed based on the determination that the one or more replica tables were not created based on the specific user-initiated request. That is, the tables of the host system may be dropped without obtaining landscape information if the host does not store any source tables and also does not store any user-requested tables.

If a particular host-to-be-removed does store source tables or a user-requested table, then landscape information and table redistribution may be performed. Accordingly, in some embodiments the method may also receive a second instruction to remove a second host system from the multi-host database system. In such embodiments the method may determine, in response to the second instruction, that the second host system stores one or more source tables or that the second host system stores a second replica table created in response to a specific user-initiated request for the second replica table. In such embodiments the method may obtain landscape information for each of the plurality of host systems in response to the determination that the second host system stores one or more source table or that the second host system stores the second replica table. In such embodiments the method may redistribute one or more of the one or more source tables and the second replica table to one or more other host systems of the plurality of host systems.

Using this method, a multi-host database system may determine whether a host may be removed (e.g., deallocated) without obtaining landscape information, thereby reducing processing and time spend removing the host in such cases. This host removal shortcut is advantageous as fewer computer processing resources, memory resources, and network resources are used to perform a host removal operation. In addition, the users experience of using the database system is improved as host removal is performed quicker.

Figure 3:
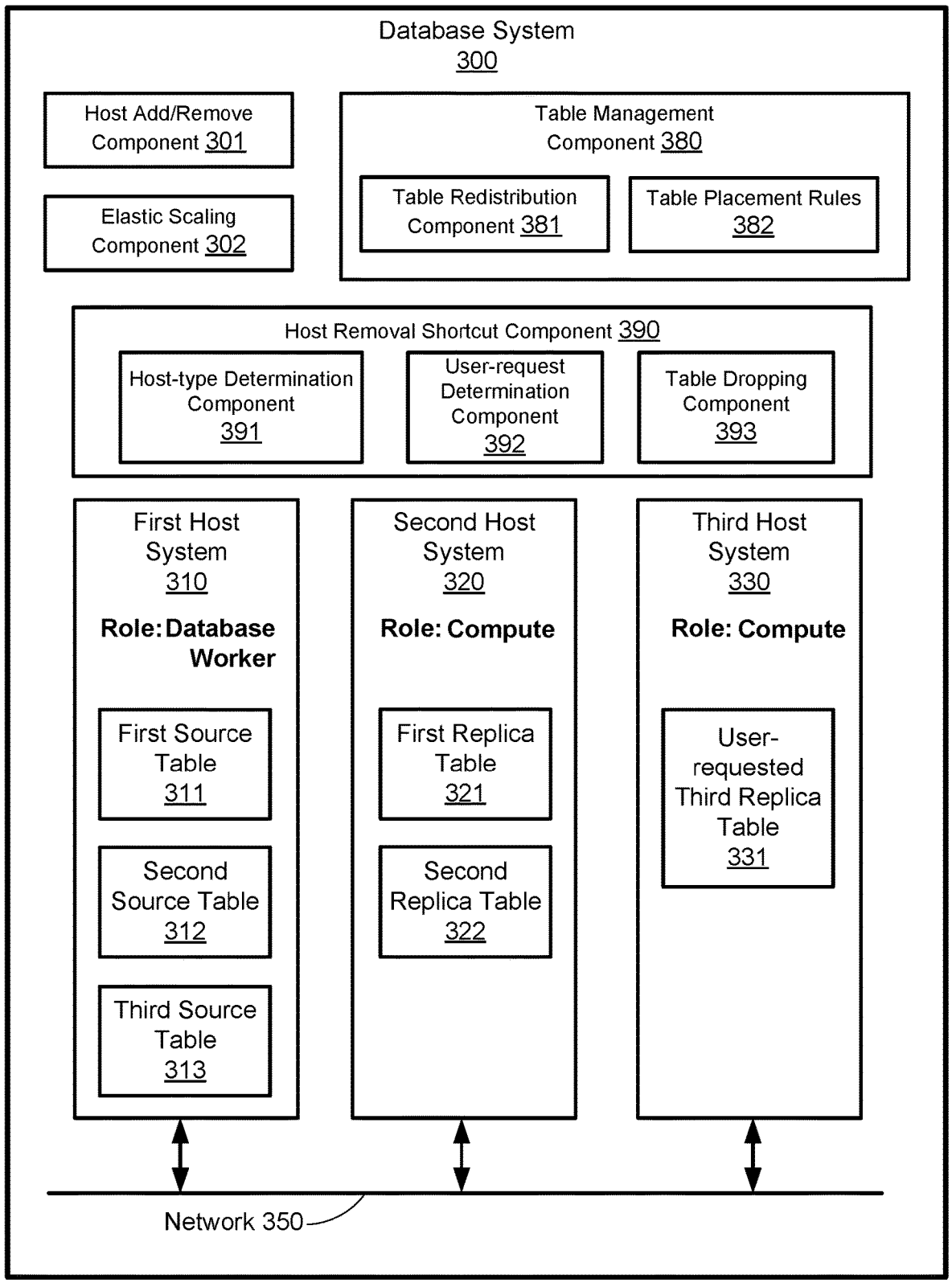
FIG. 3 shows a diagram of components of the multi-host database system, according to an embodiment.

A more detailed explanation of a multi-host database system host removal shortcut technique is now provided. FIG. 3 shows a diagram of components of the multi-host database system 300, according to an embodiment. The database system 300 of FIG. 3 may be configured similar to the database system 100 of FIG. 1 and may be configured to perform the method 200 of FIG. 2.

The database system 300 includes a first host system 310, a second host system 320, and a third host system 330 which are in communication with each other over a network 350. The first host system 310 has a role as a "database worker" and stores a first source table 311, a second source table 312, and a third source table 313. The second host system 320 has a "compute" role-type and stores a first replica table 321 replicating the first source table 311 and a second replica table 322 replicating the second source table 312. The third host system 330 stores a user-requested third replica table 331 that is a replica of the third source table 313.

The embodiment shown in FIG. 3 is simplified for purposes of describing the host removal technique. In other embodiments the database system 300 may include different hosts, a different number of hosts, a different number of source tables, and a different number of replica tables, etc.

The database system 300 also includes software components including a host add/remove component 301, an elastic scaling component 302, a table management component 380, and a host removal shortcut component 390. The database system 300 may also include other software components to perform functionality.

The host add/remove component 301 may enable a user to manually add or remove host systems from the database system. That is, allocate or deallocate host systems and their corresponding compute and memory resources.

The elastic scaling component 302 may add or remove host systems dynamically based on workload demand. The elastic scaling component 302 may be configured to perform scale-out operations and scale-in operations. In other embodiments a different system may be configured to manage and perform scale-out and scale-in operations.

The database system 300 may receive a first instruction to remove a particular host system of a plurality of host systems. This instruction may be received from the host add/remove component 301, from the elastic scaling component 302, from another component within the database system 300, or from an external system.

As used herein, "add" and "remove" do not necessarily indicate physical addition or physical removal of computer hardware. Instead, a host system may be on standby or may be used to perform other functionality outside of the database system 300 and may then be "added" to the system. Removing may simply involve placing the host on standby or allocating its resources to another purpose.

When host systems are added or removed to the database system 300, the table management component 380 may manage location of the tables among the host systems. The table management component 380 includes a table redistribution component 381 that may analyze the number, size, and demand on the tables and determine a plan for redistributing the tables among the host systems. This table redistribution may rely on landscape information, which may be obtained by or provided to the table management component 380. The table management component 380 includes table placement rules 382 which may include requirements for which tables should be placed on which hosts. The table placement rules may indicate whether a table is user-requested. That is, whether a user specifically requested creation of a particular table (e.g., a replica table). The table management component 380 may be configured to handle such requests and table creation.

The host removal shortcut component 390 may be configured to perform host shortcut removal as described herein. The host removal shortcut component 390 may include a host-type determination component 391, a user-requested determination component 392, and a table dropping component 393. The host removal shortcut component 390 may be called when a host will be removed in order to determine whether that host may be removed without collecting landscape information (e.g., because table redistribution is not needed upon removing that host).

The host-type determination component 391 may be configured to access one or more table placement rules to obtain the host-type identifier of the first host system, wherein the table placement rules indicate a number and location of replicas of the plurality of tables among the plurality of host systems. In other embodiments other data structures may be accessed to obtain host-type identifiers of the host systems.

The user-requested determination component 392 may be configured to determine that none of the one or more replica tables stored on the first host system were created based on a specific user-initiated request for a particular replica table to be created. This determination may be made based on information included in the table placement rules 382, for example.

The table dropping component 393 may be configured to drop the one or more replica tables stored on the first host system based on the determination that the first host system does not store any of the plurality of database tables. The dropping of the one or more replicas tables stored on the first host system may also be performed based on the determination that the one or more replica tables were not created based on the specific user-initiated request.

In the embodiments shown in FIG. 3, the second host system 320 does not store any source tables and it does not store any user-requested tables. Therefore, if the second host system 320 is removed, it may be removed without obtaining landscape information and without performing table redistribution. On the other hand the first host system 310 does store source tables. Therefore, if the first host system 310 is removed, landscape information may be obtained in order to redistribute the tables over other hosts systems. The landscape information may indicate which hosts current store which tables and what type of tables (e.g., source tables or replica tables) as well as the type of host (e.g., worker type or compute type). While the third host system 330 does not store source tables, it stores a user-requested table. Since this table was specifically requested by the user, the database system 300 may maintain this table by obtaining landscape information and performing table redistribution.

Figure 4:
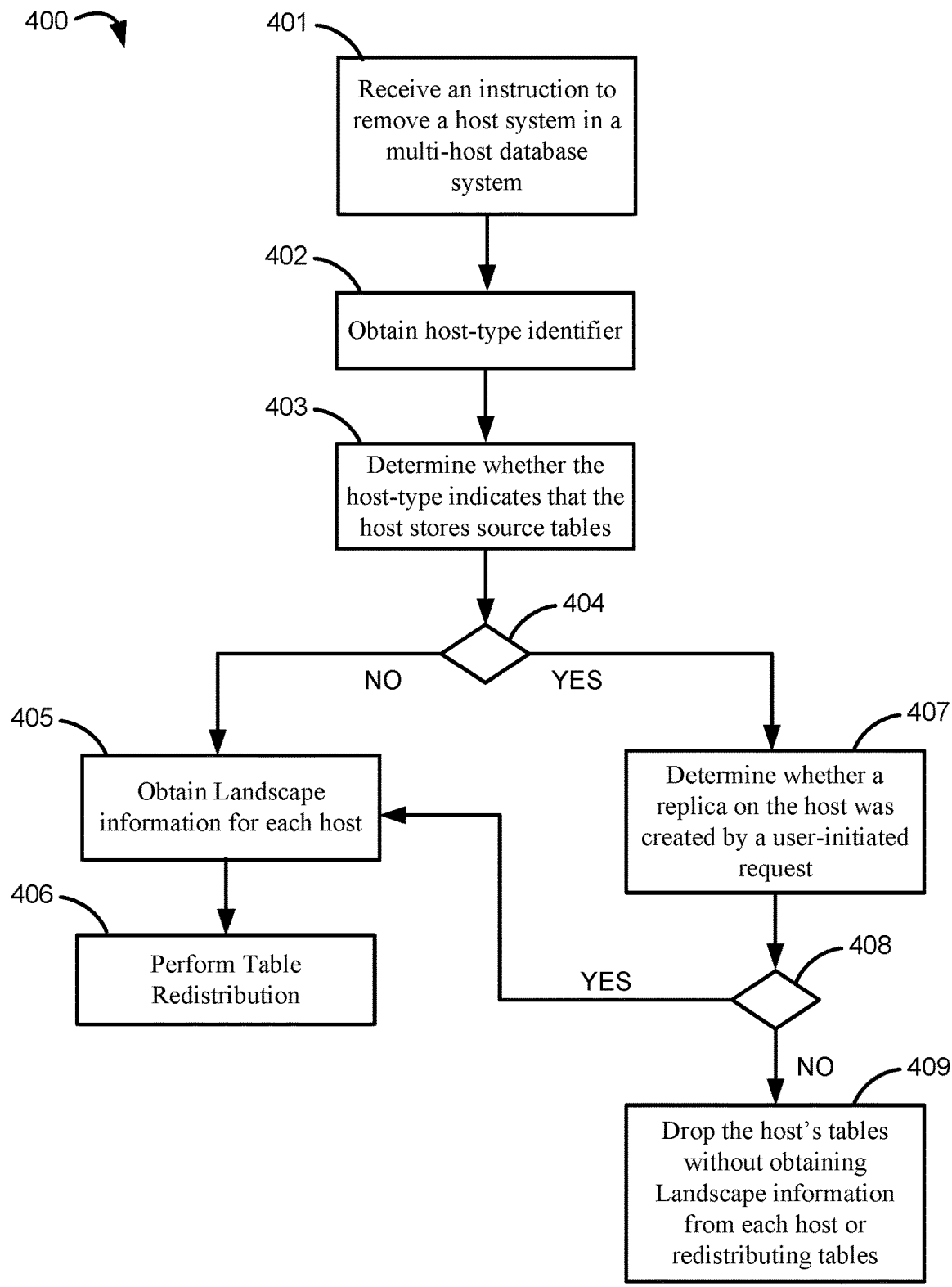
FIG. 4 shows a flow chart of a process for determining whether a host system may be dropped without obtaining landscape information, according to an embodiment.

A flow chart is described below to clarify and expand upon the decision making in whether the host removal shortcut technique may be used or not. FIG. 4 shows a flow chart 400 of a process for determining whether a host system may be dropped without obtaining landscape information, according to an embodiment. The logic and decision making on the flow chart 400 may be implemented by a multi-host database system such as those described below.

At 401, receive an instruction to remove a host system in a multi-host database system. This instruction may be initiated by a user making a specific request to remove a particular system or may be may an instruction give as part of a scale-in operation.

At 402, obtain host-type identifier of the host system. The host-type identifier may be stored within the database system and indicate whether the host is configured to store source tables or whether they are configured to not store source tables. For instance, a "compute" type node or an "elastic" type node may be configured to not store source tables. They may store replica tables instead.

At 403, determine whether the host-type indicates that the host stores source tables. If the decision at 404 is NO, then the flow chart continues to 405. If the decision at 404 is YES, the flow chart continues to 407.

At 405, obtain landscape information for each host system. After the landscape information has been obtained, at 406, perform Table Redistribution. As discussed above, obtaining landscape information and performing table redistribution may take a significant amount of time and computing resources to perform.

If the host-type does not store source tables, the decision at 404 (YES) continues to 407. At 407, determine whether a replica on the host was created by a user-initiated request. If the decision at 408 is YES, then the flow chart continues with 405 and obtains landscape information and then to 406 performing table redistribution. This is because a table specifically requested by the user may be maintained on the database system.

If the decision at 408 is NO, the flow chart continues to 409. At 409, drop the host's tables without obtaining landscape information from each host or redistributing tables. This shortcut of removing the host without obtaining landscape information or performing table redistribution provides efficiency in the host removal operation. An experiment and results of using the host removal technique are provided below.

Experimental Results

The inventors conducted an experiment on a multi-host database system. On this database system, removing a host without the shortcut technique, which involves collecting landscape information, may take several minutes. However, using the host removal shortcut technique, removing a compute host that does not store source tables took less than twenty seconds. Thus, using the host removal shortcut improved performance significantly and provided a better user experience (e.g., less wait time).

Example Hardware

Figure 5:
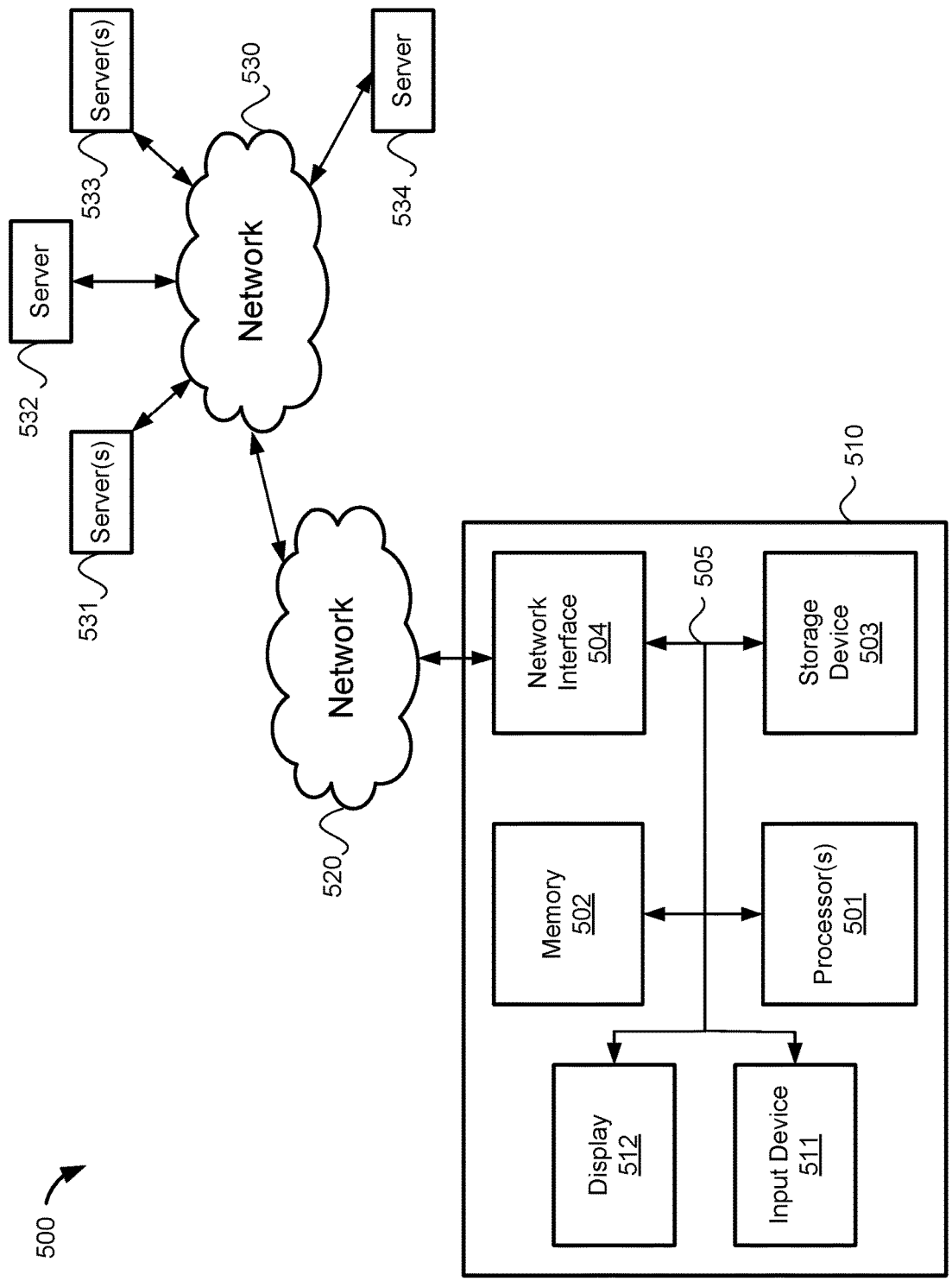
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

Example Embodiments

Various example embodiments implementing the techniques discussed above are described below.

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to receive a first instruction to remove a first host system from a multi-host database system including a plurality of host systems. The multi-host database system stores a plurality of source tables distributed across at least a portion of the plurality of host systems. The instructions may be further executable to determine, in response to the first instruction, that the first host system does not store any of the plurality of source tables based on a host-type identifier for the first host system. The first host system may store one or more replica tables that are replicas of corresponding source tables from among the plurality of source tables. The determination that the first host system does not store any of the plurality of source tables may be made without obtaining landscape information for each of the plurality of host systems. The instructions may be further executable to drop the one or more replica tables stored on the first host system based on the determination that the first host system does not store any of the plurality of database tables.

Some embodiments provide one or more non-transitory computer-readable medium storing computer program code comprising sets of instructions. The computer program code may include sets of instructions to receive a first instruction to remove a first host system from a multi-host database system including a plurality of host systems. The multi-host database system may store a plurality of source tables distributed across at least a portion of the plurality of host systems. The computer program code may further comprise sets of instructions to determine, in response to the first instruction, that the first host system does not store any of the plurality of source tables based on a host-type identifier for the first host system. The first host system may store one or more replica tables that are replicas of corresponding source tables from among the plurality of source tables. The determination that the first host system does not store any of the plurality of source tables may be made without obtaining landscape information for each of the plurality of host systems. The computer program code may further comprise sets of instructions to drop the one or more replica tables stored on the first host system based on the determination that the first host system does not store any of the plurality of database tables.

Some embodiments provide a computer-implemented method. The method may comprise receiving a first instruction to remove a first host system from a multi-host database system including a plurality of host systems. The multi-host database system may store a plurality of source tables distributed across at least a portion of the plurality of host systems. The method may further comprise determining, in response to the first instruction, that the first host system does not store any of the plurality of source tables based on a host-type identifier for the first host system. The first host system may store one or more replica tables that are replicas of corresponding source tables from among the plurality of source tables. The determination that the first host system does not store any of the plurality of source tables may be made without obtaining landscape information for each of the plurality of host systems. The method may further comprise dropping the one or more replica tables stored on the first host system based on the determination that the first host system does not store any of the plurality of database tables.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   one or more machine-readable medium coupled to the one or more processors and storing computer program code comprising sets instructions executable by the one or more processors to:
   receive a first instruction to remove a first host system of a plurality of host systems within a multi-host database system, the multi-host database system storing a plurality of source tables distributed across at least a portion of the plurality of host systems;
   determine, in response to the first instruction, that the first host system does not store any of the plurality of source tables based on a single host-type identifier for the first host system indicating that the first host system only stores replica tables and does not store source tables, the first host system storing one or more replica tables that are replicas of corresponding source tables from among the plurality of source tables;
   drop the one or more replica tables stored on the first host system, based on the determination that the first host system does not store any of the plurality of source tables, without obtaining a set of landscape information and without performing a table redistribution operation; and
   remove the first host system from the multi-host database system.

2. The computer system of claim 1, wherein the computer program code further comprises sets instructions executable by the one or more processors to:
  determine that none of the one or more replica tables stored on the first host system were created based on a specific user-initiated request for a particular replica table to be created, the dropping of the one or more replicas tables stored on the first host system being performed based on the determination that the one or more replica tables were not created based on the specific user-initiated request.

3. The computer system of claim 1, wherein the landscape information includes table information identifying the plurality of source tables, partition information indicating how the plurality of source table are partitioned, and location information indicating which host systems store which source tables.

4. The computer system of claim 1, wherein the computer program code further comprises sets instructions executable by the one or more processors to:
  access one or more table placement rules to obtain the host-type identifier of the first host system, wherein the table placement rules indicate a number and location of replicas of the plurality of tables among the plurality of host systems.

5. The computer system of claim 4, wherein the table placement rules indicate how the plurality of source tables are partitioned among the plurality of host systems.

6. The computer system of claim 1, wherein the computer program code further comprises sets instructions executable by the one or more processors to:
  receive a second instruction to remove a second host system from the multi-host database system;
  determine, in response to the second instruction, that the second host system stores one or more source tables or that the second host system stores a second replica table created in response to a specific user-initiated request for the second replica table;
  obtain landscape information for each of the plurality of host systems in response to the determination that the second host system stores one or more source table or that the second host system stores the second replica table; and
  redistribute one or more of the one or more source tables and the second replica table to one or more other host systems of the plurality of host systems.

7. The computer system of claim 1, wherein the source tables corresponding to the one or more replica tables are stored at other hosts systems from among the plurality of host systems.

8. One or more non-transitory computer-readable medium storing computer program code comprising sets of instructions to:
  receive a first instruction to remove a first host system of a plurality of host systems within a multi-host database system, the multi-host database system storing a plurality of source tables distributed across at least a portion of the plurality of host systems;
  determine, in response to the first instruction, that the first host system does not store any of the plurality of source tables based on a single host-type identifier for the first host system indicating that the first host system only stores replica tables and does not store source tables, the first host system storing one or more replica tables that are replicas of corresponding source tables from among the plurality of source tables;
  drop the one or more replica tables stored on the first host system, based on the determination that the first host system does not store any of the plurality of source tables, without obtaining a set of landscape information and without performing a table redistribution operation; and
  remove the first host system from the multi-host database system.

9. The non-transitory computer-readable medium of claim 8, wherein the computer program code further comprises sets instructions to:
  determine that none of the one or more replica tables stored on the first host system were created based on a specific user-initiated request for a particular replica table to be created, the dropping of the one or more replicas tables stored on the first host system being performed based on the determination that the one or more replica tables were not created based on the specific user-initiated request.

10. The non-transitory computer-readable medium of claim 8, wherein the landscape information includes table information identifying the plurality of source tables, partition information indicating how the plurality of source table are partitioned, and location information indicating which host systems store which source tables.

11. The non-transitory computer-readable medium of claim 8, wherein the computer program code further comprises sets instructions to:
  access one or more table placement rules to obtain the host-type identifier of the first host system, wherein the table placement rules indicate a number and location of replicas of the plurality of tables among the plurality of host systems.

12. The non-transitory computer-readable medium of claim 8, wherein the table placement rules indicate how the plurality of source tables are partitioned among the plurality of host systems.

13. The non-transitory computer-readable medium of claim 8, wherein the computer program code further comprises sets instructions to:
  receive a second instruction to remove a second host system from the multi-host database system;
  determine, in response to the second instruction, that the second host system stores one or more source tables or that the second host system stores a second replica table created in response to a specific user-initiated request for the second replica table;
  obtain landscape information for each of the plurality of host systems in response to the determination that the second host system stores one or more source table or that the second host system stores the second replica table; and
  redistribute one or more of the one or more source tables and the second replica table to one or more other host systems of the plurality of host systems.

14. The non-transitory computer-readable medium of claim 8, wherein the source tables corresponding to the one or more replica tables are stored at other hosts systems from among the plurality of host systems.

15. A computer-implemented method, comprising:
  receiving a first instruction to remove a first host system of a plurality of host systems within a multi-host database system, the multi-host database system storing a plurality of source tables distributed across at least a portion of the plurality of host systems;
  determining, in response to the first instruction, that the first host system does not store any of the plurality of source tables based on a single host-type identifier for the first host system indicating that the first host system only stores replica tables and does not store source tables, the first host system storing one or more replica tables that are replicas of corresponding source tables from among the plurality of source tables;

dropping the one or more replica tables stored on the first host system, based on the determination that the first host system does not store any of the plurality of source tables, without obtaining a set of landscape information and without performing a table redistribution operation; and removing the first host system from the multi-host database system.

16. The computer-implemented method of claim 15, further comprising:

determining that none of the one or more replica tables stored on the first host system were created based on a specific user-initiated request for a particular replica table to be created, the dropping of the one or more replicas tables stored on the first host system being performed based on the determination that the one or more replica tables were not created based on the specific user-initiated request.

17. The computer-implemented method of claim 15, wherein the landscape information includes table information identifying the plurality of source tables, partition information indicating how the plurality of source table are partitioned, and location information indicating which host systems store which source tables.

18. The computer-implemented method of claim 15, further comprising:

accessing one or more table placement rules to obtain the host-type identifier of the first host system, wherein the table placement rules indicate a number and location of replicas of the plurality of tables among the plurality of host systems, wherein the table placement rules indicate how the plurality of source tables are partitioned among the plurality of host systems.

19. The computer-implemented method of claim 15, further comprising:

receive a second instruction to remove a second host system from the multi-host database system;

determine, in response to the second instruction, that the second host system stores one or more source tables or that the second host system stores a second replica table created in response to a specific user-initiated request for the second replica table;

obtain landscape information for each of the plurality of host systems in response to the determination that the second host system stores one or more source table or that the second host system stores the second replica table; and redistribute one or more of the one or more source tables and the second replica table to one or more other host systems of the plurality of host systems.

20. The computer-implemented method of claim 15, wherein the source tables corresponding to the one or more replica tables are stored at other hosts systems from among the plurality of host systems.

* * * * *